(12) United States Patent
Bischoff et al.

(10) Patent No.: US 12,411,078 B2
(45) Date of Patent: Sep. 9, 2025

(54) METHOD AND SYSTEM FOR MATCHING AND ADJUSTING PIGMENTATION OF A SAMPLE COATING TO A TARGET COATING

(71) Applicant: BASF Coatings GmbH, Münster (DE)

(72) Inventors: Guido Bischoff, Muenster (DE); Florian Steufmehl, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 439 days.

(21) Appl. No.: 17/632,591

(22) PCT Filed: Aug. 1, 2020

(86) PCT No.: PCT/EP2020/071751
§ 371 (c)(1),
(2) Date: Feb. 3, 2022

(87) PCT Pub. No.: WO2021/023685
PCT Pub. Date: Feb. 11, 2021

(65) Prior Publication Data
US 2022/0276152 A1 Sep. 1, 2022

(30) Foreign Application Priority Data
Aug. 6, 2019 (EP) .................................. 19190395

(51) Int. Cl.
*G01N 21/25* (2006.01)
*G01N 21/31* (2006.01)

(52) U.S. Cl.
CPC .......... *G01N 21/251* (2013.01); *G01N 21/31* (2013.01)

(58) Field of Classification Search
CPC .......................... G01N 21/251; G01N 21/31
See application file for complete search history.

(56) References Cited

U.S. PATENT DOCUMENTS 5,668,633 A * 9/1997 Cheetam ................. G01J 3/46
356/402
5,720,017 A * 2/1998 Cheetam ................. G01J 3/463
345/595

(Continued)

FOREIGN PATENT DOCUMENTS

CN 1207808 A 2/1999
JP H09229773 A 9/1997

OTHER PUBLICATIONS

International Search Report and Written Opinion for corresponding PCT/EP2020/071751 mailed Oct. 2, 2020, 10 Pages.

*Primary Examiner* — Michael J Dalbo
*Assistant Examiner* — Kaleria Knox
(74) *Attorney, Agent, or Firm* — Armstrong Teasdale LLP

(57) ABSTRACT

Described herein is a computer-implemented method for matching and adjusting pigmentation of a target coating, the method including at least the steps of: retrieving from a formulation database which includes formulas for coating compositions with different pigmentations, one preliminary matching formula; providing a match metric; and by using one or more processors: calculating a match metric value for the preliminary matching formula; and deciding, based on a magnitude of the match metric value, whether the pigmentation is significantly improvable; in the case that the pigmentation is significantly improvable: defining a selection of at least one additional tinting base which might be eligible for further adjusting the preliminary matching formula to the target coating; calculating, for each of the at least one additional tinting base, a match metric value; and issuing, via an output device, a list of eligible additional tinting bases of the at least one additional tinting base.

13 Claims, 2 Drawing Sheets

(56) References Cited

U.S. PATENT DOCUMENTS

| | | | | |
|---|---|---|---|---|
| 5,841,421 A | * | 11/1998 | Cheetam | G01J 3/50 |
| | | | | 356/402 |
| 5,929,998 A | * | 7/1999 | Kettler | G01J 3/465 |
| | | | | 356/405 |
| 2003/0184772 A1 | * | 10/2003 | Agarwal | G06Q 10/10 |
| | | | | 358/1.9 |
| 2013/0201476 A1 | * | 8/2013 | Beymore | G01J 3/463 |
| | | | | 356/408 |
| 2016/0002187 A1 | * | 1/2016 | Kunzer | C07D 413/04 |
| | | | | 514/254.02 |

* cited by examiner

METHOD AND SYSTEM FOR MATCHING AND ADJUSTING PIGMENTATION OF A SAMPLE COATING TO A TARGET COATING

CROSS-REFERENCE TO RELATED APPLICATIONS

This application is a U.S. National Phase Application of International Patent Application No. PCT/EP2020/071751, filed Aug. 1, 2020, which claims priority to European Patent Application No. 19190395.4, filed Aug. 6, 2019, the entire contents of which are hereby incorporated by reference herein.

FIELD OF THE INVENTION

The present disclosure refers to a method and a system for matching and adjusting pigmentation of a sample coating to a target coating.

BACKGROUND

If color standards have to be matched and tinting is to be done, the number of required tinting steps is a decisive measure for an economic efficiency of the matching process. The appearance, i. e. the color and/or the texture of a dry paint layer, in the following also called "coating" or "color coating", is strongly depending on the tinting bases used.

A color matching process is often initiated by a search in a formulation database of already existing color measurements and their respective formulas. The formula whose measurement is close in terms of color and/or pigmentation is then chosen as a starting formula. If the pigmentation of a starting formula is not conform with the one to be matched, i. e. with that one of the target coating, the matching process usually takes longer. It also results in a solution whose quality is limited, e. g. there is still a residual color difference and/or metamerism, and the solution is eventually less reproducible. Metamerism is a phenomenon of two colors matching under one light source like daylight (CIE standard illuminant D65 with a color temperature of 6500K), but not matching under another light source, such as light from an incandescent light bulb (CIE standard illuminant A with a color temperature of 2800K).

Each included pigment in a formulation changes the color of reflected light as a result of wavelength-dependent absorption and scattering and it leads to characteristic features in a spectral remission curve of its measurement. But, unexperienced colorists do often not have the necessary expertise to tell which pigments are needed in a formulation in order to match a specific color. This is because multiple pigments are combined and their characteristic features overlap. Also, there are usually dozens of tinting bases with different pigments in a color matching system. For these reasons, the interpretation of a remission curve requires experience and a lot of training. It often occurs that due to a lack of information, an incorrect combination of tinting bases is used instead. Including the right combination of pigments into the formulation would help to match the color in a better quality in a shorter time.

Therefore, it is an object of the present disclosure to provide a possibility to advise a colorist on the pigmentation of a wanted formula of a target coating. It should be possible to automatically propose a potential missing tinting base to the colorist based on a given starting formula, in the following also called preliminary matching formula. Optionally, it is also proposed which tinting base is redundant instead. With using the proposed modified starting formula, a further color matching process could be more efficient and result in a more stable and accurate solution.

SUMMARY OF THE INVENTION

The present disclosure provides a system and a method with the features of the independent claims. Embodiments are subject of the dependent claims and the description and drawings.

Today, a color matching and adjustment process is based on digital color measurements taken with a multi-angle spectrometer, e. g. a Byk-Mac® I or a spectrometer of the XRite MA®-T-family. Reflectance of a color coating is measured from several geometries (illumination and observation directions/angles). Typical measurement geometries are a fixed illumination angle at 45° measured relative to the surface normal of the coating and viewing angles of −15°, 15°, 25°, 45°, 75°, 110°, each measured relative to the specular angle, i. e. the specular direction, the specular direction being defined as the outgoing direction that makes the same angle with the normal of the color coating surface as the incoming direction of the respective light ray. It is also possible to keep the viewing angle constant and to vary the illumination angle.

The color measurements, e. g. remission curves and/or colorimetric data which can be derived therefrom, and their respective formulas are stored in a formulation database. A color matching process, i. e. matching and adjusting color of a target coating is often initiated by a search in such a database of already existing color measurements and their respective formulas. The formula whose measurement is close in terms of color, spectral curve and optionally texture is then chosen as preliminary matching formula. A method is needed to determine if the pigmentation of the preliminary matching formula is sufficient to match the target color adequately. If the pigmentation is insufficient then a method is needed to determine the best complementary pigment in order to improve the match result for the target color.

In the scope of the present disclosure the terms "tinting base" and "pigment" are used synonymously. A tinting base is a pigment in dispersion.

The present disclosure proposes a computer-implemented method for matching and adjusting pigmentation of a target coating, the method comprising at least the steps of:
  a) retrieving, via a communications interface, from a formulation database which comprises formulas for coating compositions with different pigmentations, one (or more) preliminary matching formula(s), in the following also called starting formula;
  b) providing a match metric that describes a color difference and a spectral similarity between a remission curve given, e.g. measured for the target coating and a remission curve determined for a preliminary matching formula; and
  by using one or more processors:
  c) calculating a match metric value for the preliminary matching formula based on the remission curve measured for the target coating and the remission curve determined for the preliminary matching formula;
  d) adjusting the preliminary matching formula with respect to concentrations of the included pigments in the way that the match metric value is minimal;
  e) evaluating the match metric value of the adjusted preliminary matching formula;

f) deciding, based on a magnitude of the match metric value, whether the pigmentation of the adjusted preliminary matching formula is significantly improvable;

in the case, that the pigmentation of the adjusted preliminary matching formula is significantly improvable:

g) defining a selection of at least one additional tinting base which might be eligible for further adjusting the adjusted preliminary matching formula to the target coating, each additional tinting base being associated with a respective modified preliminary matching formula consisting of the adjusted pigmentation of the preliminary matching formula and the respective tinting base;

h) calculating, for each of the at least one additional tinting base, a match metric value for the respective modified preliminary matching formula;

i) adjusting the modified preliminary matching formula with respect to concentrations of the included pigments in the way that the match metric value is minimal;

j) assigning each of the at least one additional tinting base to the respective one match metric value for the respective one adjusted modified preliminary matching formula;

k) issuing, via an output device, a list of at least those additional tinting bases of the at least one additional tinting base whose associated adjusted modified preliminary matching formula has a remission curve that is more similar to the remission curve of the target coating than the remission curve of the adjusted preliminary matching formula with respect to the match metric.

The match metric may be, for example, a weighted sum of dE* (color difference metric) and dShape or dShape* (spectral similarity metric) (as described in the following). Generally, it is intended to adjust the preliminary matching formula in the way that the color difference dE*, optionally also the texture difference, the sparkle difference dS and the graininess difference dG, and the spectral similarity metric dShape are minimal when all metrics are considered separately, i.e. on its own. A further correction/adjustment of the preliminary matching formula is performed using a cost function which combines all those considered metrics, e. g. by adding all considered metrics together: dE* (or dL*+db*+da*)+dShape (optionally: +dS+dG+ . . . ), probably each summand being weighted appropriately and minimizing such cost function accordingly.

In the scope of the present disclosure the terms "remission curve", "spectral remission curve", "spectral curve" and "reflectance curve" are used synonymously.

For adjusting the preliminary matching formula in the way that the match metric value is minimal, a color adjustment algorithm is used in a first step (step d) which bases on a radiative transfer model, e. g. a physical model like the Kubelka-Munk model (or a statistical model like a neural network). The color adjustment algorithm determines the concentrations for the included tinting bases (or pigments) in the preliminary matching formula which lead to an optimal (minimal) match metric. It is also allowed that concentrations of tinting bases will be set to zero. In this case one tinting base is redundant or not needed.

An adjusted preliminary matching formula is to be understood as the preliminary matching formula which was adjusted regarding the match metric; a modified preliminary matching formula is to be understood as a preliminary matching formula where a tinting base was added and an adjusted modified preliminary matching formula is a modified preliminary matching formula which was further adjusted regarding the match metric.

The remission curve of the modified preliminary matching formula in step h) is predicted by a radiative transfer model (physical model like e. g. «Kubelka-Munk»-model or statistical model like e. g. neural network). This radiative transfer model is also used, as mentioned before, within the color adjustment algorithm.

According to one embodiment of the proposed method, the above mentioned method step f) comprises:

f1) comparing the match metric value for the adjusted preliminary matching formula with a first threshold value, wherein the adjusted preliminary matching formula is decided to be acceptable and not further improvable with respect to pigmentation in the case that the match metric value is smaller or equal to the first threshold value, otherwise the matching and adjusting procedure is continued with step g).

Threshold values are part of the configuration of the algorithm implemented on the one or more processors. The first threshold value is typically in the region of 0.5 . . . 1.0.

According to one further aspect, the proposed method further comprises the step of:

l) sorting, by using the one or more processors, the list with respect to a magnitude of the match metric values and, optionally, with respect to the number of redundant (and removed) pigments, respectively.

In still a further embodiment of the proposed method, above mentioned step k) further comprises:

k1) comparing for each adjusted modified preliminary formula (including an additional tinting base) a difference between the respective match metric value and the match metric value of the adjusted preliminary matching formula; and k2) listing only those additional tinting bases whose difference between both match metric values is smaller than a second threshold value (absolute improvement threshold) and whose assigned match metric values are smaller or equal to a definite ratio of the match metric value of the adjusted preliminary matching formula (relative improvement threshold).

The proposed method successively tests, based on a non-optimal starting formula, i. e. a non-optimal preliminary matching formula with respect to color and pigmentation, additional tinting bases containing different types of pigments, with respect to a reduction of a match metric that describes a difference of color and of spectral similarity between the remission curve of the target coating (target measurement) and the one of the adjusted preliminary matching formula which bases on the pigmentation of the starting formula which has been retrieved from the formulation database. By sorting the results of each calculation by an improvement of the match metric value and defining at least one threshold value, it is possible to detect and display required tinting bases to generate a better starting formula with an optimal pigmentation for a further color matching process.

According to one further embodiment of the proposed method, the adjusted modified preliminary matching formula which is associated with said at least one additional tinting base with the smallest assigned match metric value is selected as starting formula with an optimal pigmentation for further processing.

After the determination of a missing pigment and after adding this pigment to the formulation the normal color adjustment process will be started which optimizes the match metric consisting at least of color difference (e. g. dE*) and shape difference (dShape, dShape*). But with the additional pigment the adjustment is better converging and the result is more robust and has a better quality.

According to still a further embodiment of the proposed method, the method further comprises the step of:

m) issuing at least one tinting base encompassed by the adjusted preliminary matching formula that, particularly due to said at least one additional tinting base, is redundant and, thus, to be reduced in amount or completely excluded.

Generally the adjusted preliminary matching formula comprises a plurality of different tinting bases, each tinting base being used as base for generating a specific light reflection/absorption characteristic in color. An example is a green color which can be created by a tinting base containing a specific green pigment or alternatively by a tinting base containing a yellow pigment mixed with a second tinting base containing a blue pigment. However, for each color there exists a plurality of tinting bases which come in consideration when generating a respective coating. Therefore, when searching a formula whose appearance when being applied to a surface as coating, should match a target coating, there is a huge number of tinting bases which are to be considered.

According to still a further embodiment of the proposed method, the match metric is chosen as:

$$dShape = k_2 \cdot \frac{31}{n} \cdot \sum_{i=0}^{n-2} \theta_{\lambda_i} \quad (1)$$

wherein n is an integer and $k_2$ is a linear scaling factor with, for example, $k_2=0.65$, $\theta_{\lambda_i}$ is calculated by:

$$\theta_{\lambda_i} = \cos^{-1}\left(\frac{u_{\lambda_i} \cdot v_{\lambda_i}}{|u_{\lambda_i}| \cdot |v_{\lambda_i}|}\right)$$

wherein $$u_{\lambda_i} = \begin{pmatrix} k_1 \cdot \Delta\lambda_i \\ \Delta R^{norm}_{ref,\lambda_i} \end{pmatrix}$$

$$v_{\lambda_i} = \begin{pmatrix} k_1 \cdot \Delta\lambda_i \\ \Delta R^{norm}_{smp,\lambda_i} \end{pmatrix}$$

with $$\Delta R^{norm}_{ref,\lambda_i} = \Delta R^{norm}_{ref,\lambda_i + \Delta\lambda_i} - \Delta R^{norm}_{ref,\lambda_i}, \text{ and}$$

$$\Delta R^{norm}_{smp,\lambda_i} = \Delta R^{norm}_{smp,\lambda_i + \Delta\lambda_i} - \Delta R^{norm}_{smp,\lambda_i}, \text{ and}$$

$$\Delta\lambda_i = \lambda_{i+1} - \lambda_i,$$

wherein $R^{norm}_{ref,\lambda_i}$ indicates a normalized reflectance value of the target coating at the wavelength value $\lambda_i$, $R^{norm}_{ref,\lambda_i + \Delta\lambda_i}$ indicates a normalized reflectance value of the target coating at the wavelength value $\lambda_{i+1}$, $R^{norm}_{smp,\lambda_i}$ indicates a normalized reflectance value of the sample coating at the wavelength value $\lambda_i$, $R^{norm}_{smp,\lambda_{i+1}}$ indicates a normalized reflectance value of the sample coating at the wavelength value $\lambda_{i+1}$, $k_1$ is a non-linear damping parameter with, for example, $k_1=0.005$ and $\theta_{\lambda_i}$ indicates the angle between the two normalized vectors $u_{\lambda_i}$ and $v_{\lambda_i}$, the vector $u_{\lambda_i}$ indicating a normalized gradient of the reflectance curve of the target coating at $\lambda_i$ and the vector $v_{\lambda_i}$ indicating a normalized gradient of the reflectance curve of the sample coating at $\lambda_i$. Thus, $\theta_{\lambda_i}$ indicates a kind of normalized difference value/angle between both spectral curves at the wavelength value $\lambda_i$.

According to a further aspect of the proposed method, the match metric is chosen as follows:

$$dShape^* = k_2^* \cdot \frac{31}{n} \cdot \sum_{i=0}^{n-2} \frac{|\Delta R^{norm}_{smp,\lambda_i} - \Delta R^{norm}_{ref,\lambda_i}|}{k_1 \cdot \Delta\lambda_i} \quad (2)$$

wherein $k_2^*$ is a linear scaling factor with, for example, $k_2^*=100$.

The parameter $k_1$ and the parameters $k_2$, $k_2^*$ are freely selectable so as to define together (see formulas described above) the scale for the match metric value dShape, dShape*, respectively.

The match metric dShape, dShape* yields values in a scale, i.e. a scale space that is comparable to the scale space of the CIELab* color space and of color distance metrics which are defined in the CIELab* color space like e. g. the lightness difference metric dL* and the color difference metric dE*. Thus, most colorimetric data which are available and usable in a color matching, adjusting and searching process can be provided in comparable scales, so that an interpretation of the colorimetric data in an overall view is facilitated.

For the purpose of comparison, the reflectance values are normalized by a scaling function which is chosen as a non-linear scaling function $f_{ref,smp}$, particularly as follows:

$$f_{ref/smp} = \frac{1}{Norm_{R_{ref/smp}}}$$

with $$Norm_{R_{ref/smp}} = \frac{116 \cdot x_{ref/smp} - 16}{100}$$

with $$x_{ref/smp} = \begin{cases} \sqrt[3]{R_{ref/smp,center}}, & R_{ref/smp,center} > \frac{216}{24389} \\ \dfrac{\dfrac{24389}{27} R_{ref/smp,center} + 16}{116}, & \text{otherwise} \end{cases}$$

wherein $R_{ref/smp,center}$ is given by:

$$R_{ref/smp,center} = R_{ref/smp,min} + \frac{R_{ref/smp,max} - R_{ref/smp,min}}{2} \text{ with}$$

$$R_{ref/smp,max} = \text{Max}(R_{ref/smp,\lambda_i}) \text{ and } R_{ref/smp,min} = \text{Min}(R_{ref/smp,\lambda_i})$$

wherein $R_{ref/smp,\lambda_i}$ designates both, $R_{ref,\lambda_i}$ and $R_{smp,\lambda_i}$, wherein $R_{ref,\lambda_i}$ is the reflectance value of the target coating at the wavelength value $\lambda_i$ and $R_{smp,\lambda_i}$ is the reflectance value of the sample coating at the wavelength value $\lambda_i$.

The non-linear scaling function $f_{ref,smp}$ is referring to the luminance (L*) algorithm for the conversion of colors from the XYZ color space into the CIELab* color space. The L* metric is intended to mimic the logarithmic response for lightness of the human eye. The scaling function attempts to linearize the perceptibility of lightness. Due to the scaling function the gained values of the match metric can be interpreted regardless of the absolute color coordinates of the target coating, in particular regardless of its lightness L*.

Generally, it is intended to determine a formula whose color difference dE*, whose spectral similarity metric dShape and optionally also whose texture difference, whose sparkle difference dS and whose graininess difference dG are minimal when all metrics are considered separately, i.e. on its own. An alternative or supplementary correction/modification of the best matching formula may be performed using a cost function which combines all those considered metrics, e. g. by adding all considered metrics together: dE* (or dL*+da*+db*)+dShape (+dS+dG+ . . . ) and minimizing such cost function accordingly.

The present disclosure also refers to a system for providing a match metric for matching and adjusting pigmentation of a target coating, the system comprising:
A) a computing device;
B) a computer program product, the computer program product comprises computer executable codes stored on a computer readable storage medium functionally coupled to the computing device and causes the computing device to perform a computing process when in operation, the computing process comprises at least the steps of:
   B1) retrieving from a formulation database which comprises formulas for coating compositions with different pigmentations, one preliminary matching formula;
   B2) providing a match metric that describes a color difference and a spectral similarity between a remission curve given, e.g. measured for the target coating and a remission curve determined for the preliminary matching formula;
   B3) calculating a match metric value for the preliminary matching formula based on the remission curve measured for the target coating and the remission curve determined for the preliminary matching formula;
   B4) adjusting, using a color adjustment algorithm, the preliminary matching formula (concentrations of the included pigments) in the way that the match metric value is minimal;
   B5) evaluating the match metric value of the adjusted preliminary matching formula;
   B6) deciding, based on a magnitude of the match metric value, whether the pigmentation of the adjusted preliminary matching formula is significantly improvable;
in the case, that the pigmentation of the adjusted preliminary matching formula is significantly improvable:
   B7) defining a selection of at least one additional tinting base which might be eligible for further adjusting the adjusted preliminary matching formula to the target coating, each additional tinting base being associated with a respective modified preliminary matching formula consisting of the preliminary matching formula and the respective tinting base;
   B8) calculating, for each of the at least one additional tinting base, a match metric value for the respective modified preliminary matching formula;
   B9) adjusting the modified preliminary matching formula with respect to concentrations of included pigments in the way that the match metric is minimal;
   B10) assigning each of the at least one additional tinting base to the respective one match metric value for the respective one adjusted modified preliminary matching formula;
   B11) issuing a list of at least those additional tinting bases of the at least one additional tinting base whose associated adjusted modified preliminary matching formula has a remission curve that is more similar to the remission curve of the target coating than the remission curve of the adjusted preliminary matching formula with respect to the match metric.

According to one embodiment of the proposed system, the system further comprises:
C) a color measuring device;
D) the formulation database comprising formulas for coating compositions and interrelated colorimetric data;
wherein the computing device is functionally coupled to the color measuring device and the formulation database. The computing device may further comprise an input device and a display device.

Generally, the color measuring device is a spectrometer, particularly a multi-angle spectrometer, such as a Byk-Mac® I or a spectrometer of the XRite-MA®-T-family.

According to one embodiment of the proposed system, the above mentioned step B6) comprises:
   B6-1) comparing the match metric value for the adjusted preliminary matching formula with a first threshold value, wherein
      the adjusted preliminary matching formula is decided to be acceptable and not improvable in the case that the match metric value is smaller or equal to the first threshold value, otherwise the matching and adjusting procedure is continued with step B7).

According to one further aspect, the computing process further comprises the step of:
   B12) sorting the list with respect to a magnitude of the match metric values and (optionally) with respect to the number of redundant (and removed) pigments, respectively.

According to still another aspect, step B11) further comprises:
   B11-1) comparing for each adjusted modified preliminary formula (including an additional tinting base) the difference between the respective match metric value and the match metric value of the adjusted preliminary matching formula; and
   B11-2) listing only those additional tinting bases whose difference between both match metric values is smaller than a second threshold value (absolute improvement threshold) and whose assigned match metric values are smaller or equal to a definite ratio of the match metric value of the adjusted preliminary matching formula (relative improvement threshold).

Generally, at least the color measuring device, the computing device and the formulation database are networked among each other via respective communicative connections. Each of the communicative connections between the different components of the system may be a direct connection or an indirect connection, respectively. Each communicative connection may be a wired or a wireless connection. Each suitable communication technology may be used. The formulation database, the color measuring device, the computing device, each may include one or more communications interfaces for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication.

The computing device may include or may be in communication with one or more input units, such as a touch screen, an audio input, a movement input, a mouse, a keypad input and/or the like. Further the computing device may include or may be in communication with one or more output units, such as an audio output, a video output, screen/display output, and/or the like.

Embodiments of the invention may be used with or incorporated in a computer system that may be a standalone unit or include one or more remote terminals or devices in communication with a central computer, located, for example, in a cloud, via a network such as, for example, the Internet or an intranet. As such, the computing device described herein and related components may be a portion of a local computer system or a remote computer or an online system or a combination thereof. The formulation database and software described herein may be stored in computer internal memory or in a non-transitory computer readable medium.

Within the scope of the present disclosure the database may be part of a data storage unit or may represent the data storage unit itself. The terms "database" and "data storage unit" are used synonymously.

The proposed method and system allow a better converging of a color matching and adjustment process. It is possible to sufficiently match colors although the starting formula has a non-optimal pigmentation, yet. Further, an effort needed in a respective laboratory can be reduced for color development and for customer service matching. The color matching process as a whole is more reliable and faster.

The present disclosure also refers to a computer readable storage medium functionally coupled to a computing device storing a computer program product which comprises computer executable codes and causes the computing device to perform a computing process when in operation, the computing process comprises at least the steps of:

B1) retrieving from a formulation database which comprises formulas for coating compositions with different pigmentations, one preliminary matching formula;

B2) providing a match metric that describes a color difference and a spectral similarity between a remission curve given, e.g. measured for the target coating and a remission curve determined for the preliminary matching formula;

B3) calculating a match metric value for the preliminary matching formula based on the remission curve measured for the target coating and the remission curve determined for the preliminary matching formula;

B4) adjusting, using a color adjustment algorithm, the preliminary matching formula (concentrations of the included pigments) in the way that the match metric value is minimal;

B5) evaluating the match metric value of the adjusted preliminary matching formula;

B6) deciding, based on a magnitude of the match metric value, whether the pigmentation of the adjusted preliminary matching formula is significantly improvable; in the case, that the pigmentation of the adjusted preliminary matching formula is significantly improvable:

B7) defining a selection of at least one additional tinting base which might be eligible for further adjusting the adjusted preliminary matching formula to the target coating, each additional tinting base being associated with a respective modified preliminary matching formula consisting of the preliminary matching formula and the respective tinting base;

B8) calculating, for each of the at least one additional tinting base, a match metric value for the respective modified preliminary matching formula;

B9) adjusting the modified preliminary matching formula with respect to concentrations of included pigments in the way that the match metric is minimal;

B10) assigning each of the at least one additional tinting base to the respective one match metric value for the respective one adjusted modified preliminary matching formula;

B11) issuing a list of at least those additional tinting bases of the at least one additional tinting base whose associated adjusted modified preliminary matching formula has a remission curve that is more similar to the remission curve of the target coating than the remission curve of the adjusted preliminary matching formula with respect to the match metric.

According to one aspect of the proposed computer readable storage medium, wherein the computing process further comprises the step of:

B12) sorting the list with respect to a magnitude of the match metric values and (optionally) with respect to the number of redundant (and removed) pigments, respectively.

The invention is further defined in the following examples. It should be understood that these examples, by indicating preferred embodiments of the invention, are given by way of illustration only. From the above discussion and the examples, one skilled in the art can ascertain the essential characteristics of this invention and without departing from the spirit and scope thereof, can make various changes and modifications of the invention to adapt it to various uses and conditions.

DETAILED DESCRIPTION OF THE DRAWINGS

Figure 1A:
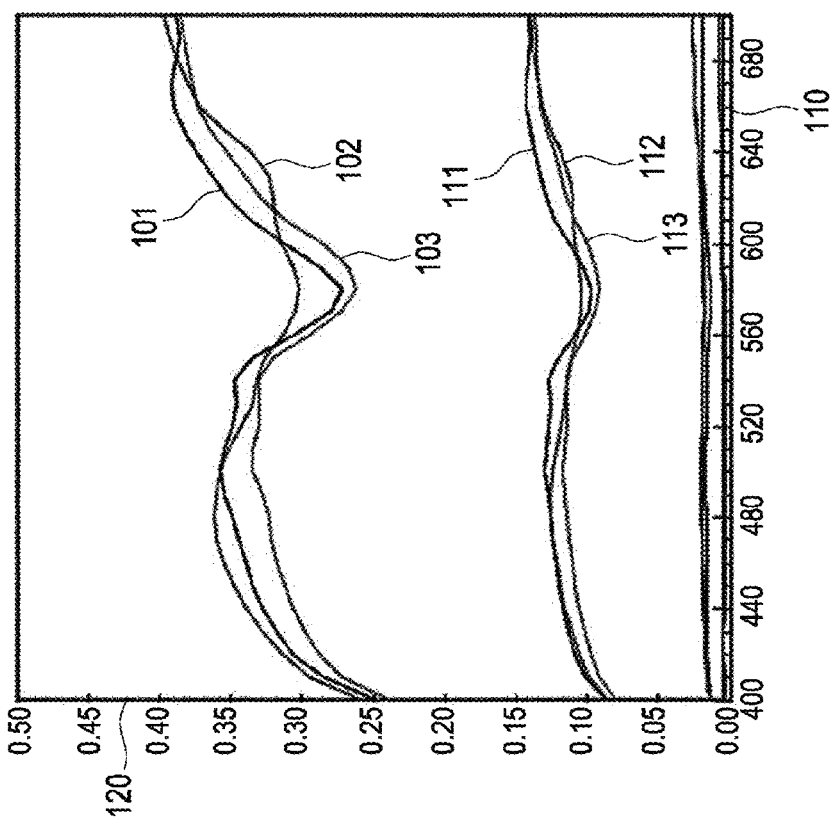
FIG. 1 shows in FIG. 1a remission curves of a target coating and of a preliminary matching formula with a non-optimal pigmentation with respect to the target coating and in FIG. 1b additionally a further remission curve of a modified preliminary matching formula with an optimal pigmentation with respect to the target coating.

FIG. 1a shows a diagram with a horizontal axis 110 along which a wavelength value is plotted and with a vertical axis 120 along which a reflectance value/intensity is plotted. Different remission curves are shown. The remission curves 101 and 111 are measured for a target coating at two different viewing angles (measurement geometries). The remission curves 102 and 112 are determined for a preliminary matching formula for the same two different viewing angles. It can be clearly recognized that the preliminary matching formula has a non-optimal pigmentation with respect to the target coating as there is, for each considered viewing angle (measurement geometry), an inacceptable visible difference in shape between the remission curves 101, 111 of the target coating and the remission curves 102, 112 of the preliminary matching formula, respectively.

Figure 1B:
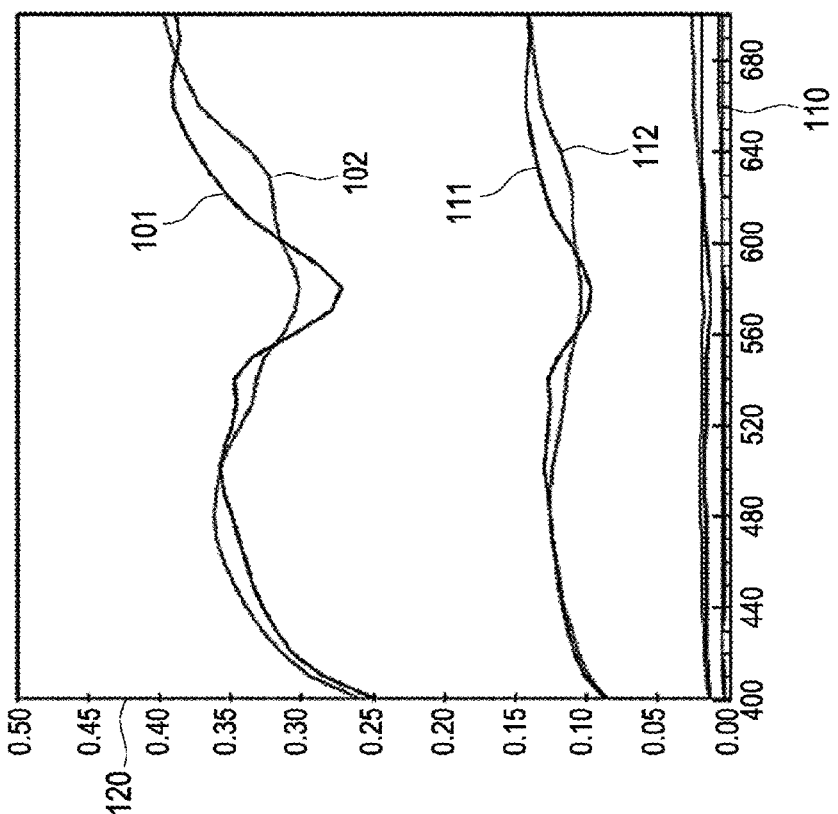

FIG. 1b additionally shows, for the same viewing angles (measurement geometries) as in FIG. 1a, remission curves 103, 113 of a modified preliminary matching formula. Those remission curves 103, 113 show a better similarity in shape with the target coating than the remission curves 102, 112 of the preliminary matching formula. Such similarity can be calculated by means of a match metric as defined, for example, by formulas (1) or (2) as described before. By means of an embodiment of the proposed method, it is possible to find, starting from the preliminary matching formula, at least one additional tinting base, i. e. one additional pigment which is to be added in order to improve the matching, by systematically and successively checking the spectral similarity and also the color difference of all available and suitable tinting bases, added to the preliminary matching formula, thus resulting in respective modified preliminary matching formulas, with the target coating based on a magnitude of the match metric values which are to be calculated for each of such modified preliminary matching formulas.

Figure 2:
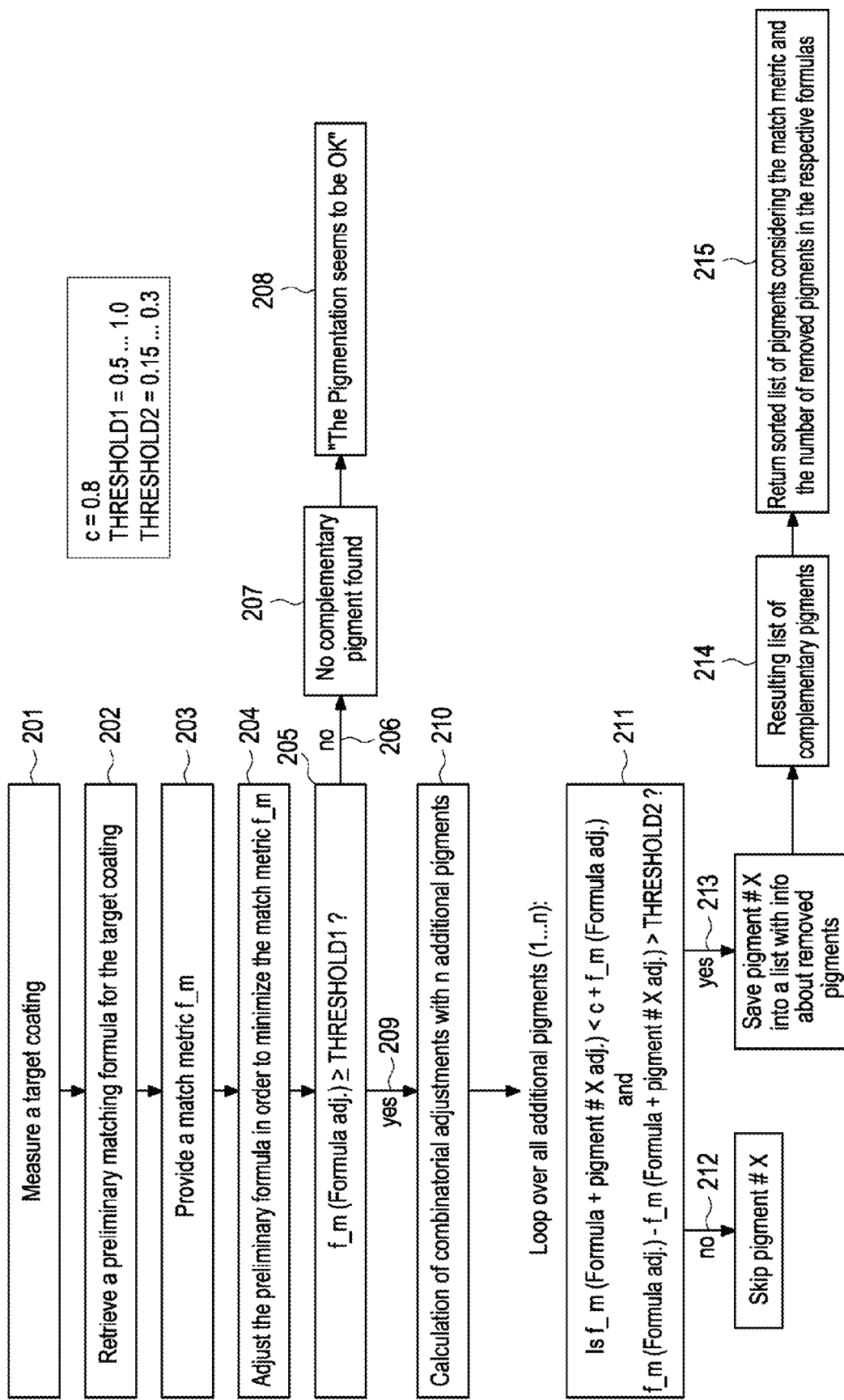
FIG. 2 shows a flow diagram illustrating one embodiment of the proposed method.

FIG. 2 shows a flow diagram of one embodiment of the proposed method. In step 201, a target coating is given, e.g. measured, which is to be matched by a color formula which has to be determined by a color matching process.

In a method step 202, a starting formula, i. e. a preliminary matching formula is retrieved from a formulation database which comprises formulas for coating compositions with different pigmentations. Generally, there are several primary colors and for each primary color, there are several tinting bases, i. e. pigments.

Each coating composition, i. e. each formula for such coating composition is based on one or more tinting bases so that the respective coating gets a specific appearance in color, texture, etc. However, with the only singular knowledge of color, texture, etc., it is not straightforward to conclude which tinting bases are used, as for each primary color a plurality of tinting bases exists.

A remission curve associated with the starting formula can also be retrieved from the database or be predicted by a radiative transfer model. Alternatively, the remission curve of the starting formula can be measured by a measuring device, when a sample coating is provided based on the starting formula.

A remission curve of the target coating is given, e. g. measured by a measuring device.

In step 203, a match metric f_m is provided on the basis of which it is to be evaluated how good the starting formula already matches the target coating. In step 204 the starting formula is first optimized/adjusted by any formula correction methodology currently used in color tools so as to minimize the match metric f_m. Such correction methodology, i. e. standard shading method, can operate, for example, in color space and gear to improve the starting formula with respect to the concentrations of all tinting bases (colorants) used. For this task a color adjustment algorithm is used which bases on a radiative transfer model, e. g. a physical model like the Kubelka-Munk model (or a statistical model like a neural network). The color adjustment algorithm determines the concentrations for the included tinting bases (or pigments) in the preliminary matching formula which lead to an optimal (minimal) match metric.

From such correction methodology, an adjusted starting formula (Formula adj.) results. In step 205, the match metric value f_m is evaluated according to the following inequation (condition):

$$f\_m(\text{Formula adj.}) \geq \text{THRESHOLD1}$$

with the f_m(Formula adj.) being the match metric value of the adjusted starting formula. THRESHOLD1 being a pre-given parameter, also called first threshold value aforesaid.

Based on that inequation, i. e. based on a magnitude of the match metric value f_m of the adjusted starting formula, it is decided whether the pigmentation of the adjusted starting formula, i. e. the adjusted preliminary matching formula is further significantly improvable.

In the case that the f_m(Formula adj.) is smaller than the first threshold value, THRESHOLD1, as indicated by arrow 206, no additional tinting base, i. e. no additional pigment has to be added to the adjusted starting formula in order to improve the matching with the target coating (207). It is stated in a step 208 that the pigmentation of the starting formula seems to be ok. Such statement is output for a user via an output device, e. g. displayed on a display unit and/or output via an audio output device.

In the case that the f_m(Formula adj.) is greater or equal to the first threshold value THRESHOLD1, as indicated by arrow 209, it is an object to get still closer to the pigmentation of the target coating by successively adding available tinting bases, i. e. pigments to the adjusted starting formula (i.e. the adjusted preliminary matching formula).

In step 210 a calculation of combinatorial adjustments with n additional pigments is performed, with n being a natural number. That means that successively one additional tinting base after the other, i. e. one additional pigment #X after the other is selected from a group of n available tinting bases, and added to the adjusted starting formula, which results in a modified preliminary matching formula, respectively. In the example described here, the group of available tinting bases comprise n different tinting bases based on n different pigments, each pigment being designated as #X. Each such modified preliminary matching formula has also been optimized/adjusted by any correction methodology as described with respect to step 204, resulting in an adjusted modified preliminary matching formula (Formula+pigm. #X adj.).

The match metric value for each adjusted modified preliminary matching formula which is calculated based on the remission curve measured for the target coating and a remission curve determined for the respective adjusted modified preliminary matching formula, is evaluated in step 211 according to the following inequations (condition):

$$f\_m(\text{Formula+pigm. \#X adj.}) \leq c \times f\_m(\text{Formula adj.})$$

and $$f\_m(\text{Formula adj.}) - f\_m(\text{Formula+pigm. \#X adj.}) > \text{THRESHOLD2}.$$

wherein c and THRESHOLD2 are pre-given parameters, e. g. c=0.8 and THRESHOLD2=0.15, . . . , 0.3.

In the case that one or both inequations are not fulfilled, it is stated in step 212 that the selected additional tinting base, i. e. the additional pigment X does not improve the matching with the target coating, and, thus, said additional tinting base, i. e. said additional pigment is skipped and has not to be added to the adjusted starting formula in order to improve the matching with the target coating. Such statement is output for a user, e. g. displayed on a display unit and/or output via an audio output device.

In the case that both inequations are fulfilled, as indicated by arrow 213, the respective pigment #X is saved into a list together with information about any change in magnitude of the corresponding match metric value and about the number of pigments which are used in the respective adjusted modified preliminary matching formulation. Each adjusted modified preliminary matching formulation "Formula+pigment #X adj." has been adjusted using a color adjustment algorithm, as mentioned before, which determines the concentrations for all included tinting bases (or pigments) in the respective modified preliminary matching formula which leads to an optional (minimal) match metric. Thereby, it is possible that concentrations of tinting bases will be set to zero. In this case one tinting base is redundant, e.g. replaced by the newly added pigment #X, or not needed.

Those solutions could be preferred in order to provide a formulation with a low number of ingredients.

The process is successively repeated for all additional pigments #X (1, ..., n).

In step 214 a resulting list of additional potential complementary pigments is obtained and issued via an output device.

Finally, in step 215, the list of potential additional pigments, i. e. of additional tinting bases is sorted with respect to a magnitude of the match metric values, i. e. by the minimum and (optionally) with respect to the number of redundant (and removed) pigments. The tinting base whose associated adjusted modified preliminary matching formula has the smallest match metric value, e. g. the lowest shape difference value and the lowest color distance dE*, is chosen/selected as said tinting base which is to be added to the adjusted starting formula in order to improve the matching with the target coating. Said selected tinting base is proposed to a user via a respective output unit, such as a display and/or an audio output.

Optionally, it is further considered how many pigments are included in the respective listed adjusted modified preliminary matching formulations. Said one is chosen which has both, the lowest match metric value and the lowest number of pigments. In case of doubts both conditions have to be traded against each other.

Such conditions are evaluated for all tinting bases, i.e. pigments which are listed.

LIST OF REFERENCE SIGNS

110 horizontal axis
120 vertical axis
101 remission curve of a target coating
111 remission curve of a target coating
102 remission curve for a preliminary matching
112 remission curve for a preliminary matching
103 remission curve for a modified preliminary matching formula
113 remission curve for a modified preliminary matching formula
201 method step
202 method step
203 method step
204 method step
205 method step
206 arrow
207 conclusion
208 method step
209 arrow
210 method step
211 method step
212 method step
213 arrow
214 method step
215 method step

The invention claimed is:

1. A computer-implemented method for adjusting pigmentation of a sample coating to match a target coating, the method comprising at least the steps of:
 a) retrieving from a formulation database which comprises formulas for coating compositions with different pigmentations, one preliminary matching formula for the sample coating;
 b) providing a match metric that describes a color difference and a spectral similarity between a remission curve given for the target coating and a remission curve determined for the preliminary matching formula; and
 by using one or more processors:
 c) calculating a match metric value for the preliminary matching formula based on the remission curve given for the target coating and the remission curve determined for the preliminary matching formula;
 d) adjusting the preliminary matching formula with respect to concentrations of included pigments to minimize the match metric value;
 e) evaluating the match metric value of the adjusted preliminary matching formula; and
 f) comparing the match metric value for the adjusted preliminary matching formula with a first threshold value; and
 when the match metric value is smaller than or equal to the first threshold value:
 f1) determining the adjusted preliminary matching formula is acceptable; and
 f2) issuing, via an output device, the adjusted preliminary matching formula as a starting formula for further color matching of the sample coating; and
 when the match metric value is greater than the first threshold value:
 g) selecting a pigment to be added to the adjusted preliminary matching formula;
 h) calculating a match metric value for a respective adjusted modified preliminary matching formula associated with the addition of the selected pigment to the adjusted preliminary matching formula;
 i) iteratively repeating steps g) and h) until the calculated match metric value for the respective adjusted modified preliminary matching formula is less than or equal to the first threshold to thereby define the starting formula with an optimal pigmentation;
 j) after step i), assigning each of the selected pigments to the respective match metric value which has been calculated for the respective adjusted modified preliminary matching formula;
 k) issuing, via the output device, the starting formula for the sample coating, the starting formula including a list of the selected pigments and having an associated remission curve that is more similar to the remission curve of the target coating than the remission curve of the adjusted preliminary matching formula; and
 l) adding at least one of the selected pigments from the list into dispersion in the sample coating to achieve an improved sample coating for further color matching.

2. The method according to claim 1, further comprising the step of:

l) sorting the list with respect to a magnitude of the match metric values, respectively.

3. The method according to claim 2, wherein the adjusted modified preliminary matching formula which is associated with said at least one additional pigment with the smallest assigned match metric value is selected as the starting formula.

4. The method according to claim 3, further comprising the step of:
m) issuing at least one pigment encompassed by the adjusted preliminary matching formula that is redundant and, thus, to be reduced in amount or completely excluded.

5. The method according to claim 1, wherein step k) further comprises:
k1) comparing for each adjusted modified preliminary matching formula a difference between the respective match metric value and the match metric value of the adjusted preliminary matching formula; and
k2) listing only those additional pigments whose difference between both match metric values is smaller than a second threshold value and whose assigned match metric values are smaller or equal to a definite ratio of the match metric value of the adjusted preliminary matching formula.

6. The method according to claim 1, wherein the match metric is chosen as:

$$dShape = k_2 \cdot \frac{31}{n} \cdot \sum_{i=0}^{n-2} \theta_{\lambda_i}$$

wherein n is an integer and $k_2$ is a linear scaling factor with, for example, $k_2=0.65$, $\theta_{\lambda_i}$ is calculated by:

$$\theta_{\lambda_i} = \cos^{-1}\left(\frac{v_{\lambda_i} \cdot v_{\lambda_i}}{|u_{\lambda_i}| \cdot |v_{\lambda_i}|}\right)$$

wherein $$u_{\lambda_i} = \begin{pmatrix} k_1 \cdot \Delta\lambda_i \\ \Delta R_{ref,\lambda_i}^{norm} \end{pmatrix}$$

$$v_{\lambda_i} = \begin{pmatrix} k_1 \cdot \Delta\lambda_i \\ \Delta R_{smp,\lambda_i}^{norm} \end{pmatrix}$$

$$\Delta R_{ref,\lambda_i}^{norm} = R_{ref,\lambda_i+\Delta\lambda_i}^{norm} - R_{ref,\lambda_i}^{norm}, \text{ and}$$

$$\Delta R_{smp,\lambda_i}^{norm} = R_{smp,\lambda_i+\Delta\lambda_i}^{norm} - R_{smp,\lambda_i}^{norm}, \text{ and}$$

$$\Delta\lambda_i = \lambda_{i+1} - \lambda_i,$$

wherein $R_{ref,\lambda_i}^{norm}$ indicates a normalized reflectance value of the target coating at the wavelength value, $\lambda_i$, $R_{ref,\lambda_i+\Delta\lambda_i}^{norm}$ indicates a normalized reflectance value of the target coating at the wavelength value, $\lambda_{i+1}$, $R_{smp,\lambda_i}^{norm}$ indicates a normalized reflectance value of the sample coating at the wavelength value, $\lambda_i$, $R_{smp,\lambda_{i+1}}^{norm}$ indicates a normalized reflectance value of the sample coating at the wavelength, value $\lambda_{i+1}$, $k_1$ is a non-linear damping parameter with, for example, $k_1=0.005$, and $\theta_{\lambda_i}$ indicates the angle between the two normalized vectors $u_{\lambda_i}$ and $v_{\lambda_i}$, the vector $u_{\lambda_i}$ indicating a normalized gradient of the reflectance curve of the target coating at $\lambda_i$ and the vector $v_{\lambda_i}$ indicating a normalized gradient of the reflectance curve of the sample coating at $\lambda_i$.

7. The method according to claim 6, wherein the reflectance values are normalized by a scaling function which is chosen as a non-linear scaling function $f$ as follows:

$$f_{ref/smp} = \frac{1}{Norm_{R_{ref/smp}}}$$

with $$Norm_{R_{ref/smp}} = \frac{116 \cdot x_{ref/smp} - 16}{100}$$

with $$x_{ref/smp} = \begin{cases} \sqrt[3]{R_{ref/smp,center}}, & R_{ref/smp,center} > \frac{216}{24389} \\ \frac{\frac{24389}{27} R_{ref/smp,center} + 16}{116}, & \text{otherwise} \end{cases}$$

wherein $R_{ref/smp,center}$ is given by:

$$R_{ref/smp,center} = R_{ref/smp,min} + \frac{R_{ref/smp,max} - R_{ref/smp,min}}{2}, \text{ with}$$

$$R_{ref/smp,max} = \text{Max}(R_{ref/smp,\lambda_i}) \text{ and } R_{ref/smp,min} = \text{Min}(R_{ref/smp,\lambda_i}).$$

8. The method according to claim 1, wherein the match metric is chosen as follows:

$$dShape^* = k_2^* \cdot \frac{31}{n} \cdot \sum_{i=0}^{n-2} \frac{|\Delta R_{smp,\lambda_i}^{norm} - \Delta R_{ref,\lambda_i}^{norm}|}{k_1 \cdot \Delta\lambda_i}$$

wherein n is an integer and $k^*_2$ is a linear scaling factor with, for example,
$k^*_2=100$,
$\Delta R_{ref,\lambda_i}^{norm}=R_{ref,\lambda_i+\Delta\lambda_i}^{norm}-R_{ref,\lambda_i}^{norm}$, and
$\Delta R_{ref,\lambda_i}^{norm}=R_{ref,\lambda_i+\Delta\lambda_i}^{norm}-R_{ref,\lambda_i}^{norm}$, and
$\Delta\lambda_i=\lambda_{i+1}-\lambda_i$,
wherein $R_{ref,\lambda_i}^{norm}$ indicates a normalized reflectance value of the target coating at the wavelength value, $\lambda_i$, $R_{ref,\lambda_i+\Delta\lambda_i}^{norm}$ indicates a normalized reflectance value of the target coating at the wavelength value, $\lambda_{i+1}$, $R_{ref,\lambda_i}^{norm}$ indicates a normalized reflectance value of the sample coating at the wavelength value, $\lambda_i$, $R_{smp,\lambda_{i+1}}^{norm}$ indicates a normalized reflectance value of the sample coating at the wavelength value, and $\lambda_{i+1}$, $k_1$ is a non-linear damping parameter with, for example, $k_1=0.005$.

9. A system for providing a match metric for matching and adjusting pigmentation of a target coating and at least one specimen coating, the system comprising:
A) a computing device; and
B) a computer program product, the computer program product comprises computer executable codes stored on a non-transitory computer readable storage medium functionally coupled to the computing device and causes the computing device to perform a computing process when in operation, the computing process comprises the steps of:
B1) retrieving from a formulation database which comprises formulas for coating compositions with different pigmentations, one preliminary matching formula for the sample coating;

B2) providing a match metric that describes a color difference and a spectral similarity between a remission curve given for the target coating and a remission curve determined for the preliminary matching formula; and by using one or more processors:

B3) calculating a match metric value for the preliminary matching formula based on the remission curve given for the target coating and the remission curve determined for the preliminary matching formula;

B4) adjusting the preliminary matching formula with respect to concentrations of included pigments to minimize the match metric value;

B5) evaluating the match metric value of the adjusted preliminary matching formula; and B6) comparing the match metric value for the adjusted preliminary matching formula with a first threshold value; and when the match metric value is smaller than or equal to the first threshold value:

B6(1) determining the adjusted preliminary matching formula is acceptable; and

B6(2) issuing, via an output device, the adjusted preliminary matching formula as a starting formula for further color matching of the sample coating; and when the match metric value is greater than the first threshold value:

B7) selecting a pigment to be added to the adjusted preliminary matching formula;

B8) calculating a match metric value for a respective adjusted modified preliminary matching formula associated with the addition of the selected pigment to the adjusted preliminary matching formula;

B9) iteratively repeating steps B7) and B8) until the calculated match metric value for the respective adjusted modified preliminary matching formula is less than or equal to the first threshold to thereby define the starting formula with an optimal pigmentation;

B10) after step B9), assigning each of the selected pigments to the respective match metric value which has been calculated for the respective adjusted modified preliminary matching formula;

B11) issuing, via the output device, the starting formula for the sample coating, the starting formula including a list of the selected pigments and having an associated remission curve that is more similar to the remission curve of the target coating than the remission curve of the adjusted preliminary matching formula; and B12) adding at least one of the selected pigments from the list into dispersion in the sample coating to achieve an improved sample coating for further color matching.

10. The system according to claim 9, further comprising:
C) a color measuring device; and
D) the formulation database;
wherein the computing device is functionally coupled to the color measuring device and the formulation database.

11. The system according to claim 9, wherein the computing process further comprises the step of:

B12) sorting the list with respect to a magnitude of the match metric values, respectively.

12. A non-transitory computer readable storage medium functionally coupled to a computing device storing a computer program product which comprises computer executable codes and causes the computing device to perform a computing process when in operation, the computing process comprising the steps of:

B1) retrieving from a formulation database which comprises formulas for coating compositions with different pigmentations, one preliminary matching formula for the sample coating;

B2) providing a match metric that describes a color difference and a spectral similarity between a remission curve given for the target coating and a remission curve determined for the preliminary matching formula;

B3) calculating a match metric value for the preliminary matching formula based on the remission curve given for the target coating and a remission curve determined for the preliminary matching formula;

B4) adjusting the preliminary matching formula with respect to concentrations of included pigments to minimize the match metric value;

B5) evaluating the match metric value of the adjusted preliminary formula; and

B6) comparing the match metric value for the adjusted preliminary matching formula with a first threshold value; and when the match metric value is smaller than or equal to the first threshold value:

B6(1) determining the adjusted preliminary matching formula is acceptable; and

B6(2) issuing, via an output device, the adjusted preliminary matching formula as a starting formula for further color matching of the sample coating; and when the match metric value is greater than the first threshold value:

B7) selecting a pigment to be added to the adjusted preliminary matching formula;

B8) calculating a match metric value for a respective adjusted modified preliminary matching formula associated with the addition of the selected pigment to the adjusted preliminary matching formula;

B9) iteratively repeating steps B7) and B8) until the calculated match metric value for the respective adjusted modified preliminary matching formula is less than or equal to the first threshold to thereby define the starting formula with an optimal pigmentation;

B10) after step B9), assigning each of the selected pigments to the respective match metric value which has been calculated for the respective adjusted modified preliminary matching formula;

B11) issuing, via the output device, the starting formula for the sample coating, the starting formula including a list of the selected pigments and having an associated remission curve that is more similar to the remission curve of the target coating than the remission curve of the adjusted preliminary matching formula; and B12) adding at least one of the selected pigments from the list into dispersion in the sample coating to achieve an improved sample coating for further color matching.

13. The non-transitory computer readable storage medium according to claim 12, wherein the computing process further comprises the step of:

B12) sorting the list with respect to the magnitude of the match metric values, respectively.

* * * * *